United States Patent [19]

Jacobson et al.

[11] 4,262,825
[45] Apr. 21, 1981

[54] LOUVERED CLAMSHELL DOOR ASSEMBLY FOR PREHEATER CHARGING BUCKET

[75] Inventors: Jon O. Jacobson, Seattle; Richard E. Parks, Bellevue, both of Wash.

[73] Assignee: Harrison Robert Woolworth, Kent, Wash.

[21] Appl. No.: 53,178

[22] Filed: Jun. 29, 1979

[51] Int. Cl.³ .............................................. C22B 1/00
[52] U.S. Cl. .............................. 222/503; 222/146 H; 222/558; 432/241
[58] Field of Search .................... 294/70, 71; 414/624, 414/726; 432/241; 266/901; 222/146 H, 503, 504, 556, 558

[56] References Cited

U.S. PATENT DOCUMENTS

| 3,390,872 | 7/1968 | Ciochetto . |
| 3,669,436 | 6/1972 | Kemmetmueller . |

FOREIGN PATENT DOCUMENTS

| 862578 | 7/1949 | Fed. Rep. of Germany | 222/503 |
| 2602354 | 10/1975 | Fed. Rep. of Germany | 266/901 |

Primary Examiner—David A. Scherbel
Attorney, Agent, or Firm—Christensen, O'Connor, Johnson & Kindness

[57] ABSTRACT

A louvered clamshell door assembly for the bottom of a preheating charging bucket includes a pair of doors which open by swinging outwardly and upwardly to discharge scrap metal from the bucket and which cooperably adjoin upon closing to retain scrap metal in the bucket. The doors include multiple stepped louvers which form the bottom weight-bearing surface of the charging bucket. The louvers of each door are supported by underlying chair support plates and are pivotably attached thereto to prevent jamming of scrap metal pieces between the louvers and to also permit thermal contraction and expansion of the louvers over many preheating cycles. Free convection of air through the louvers and scrap metal is facilitated by air deflectors attached to the chair support plates. Lateral shock absorption slots in the chair support plates improve the shock absorption capacity of the clamshell door assembly during loading of the bucket with scrap metal.

15 Claims, 4 Drawing Figures

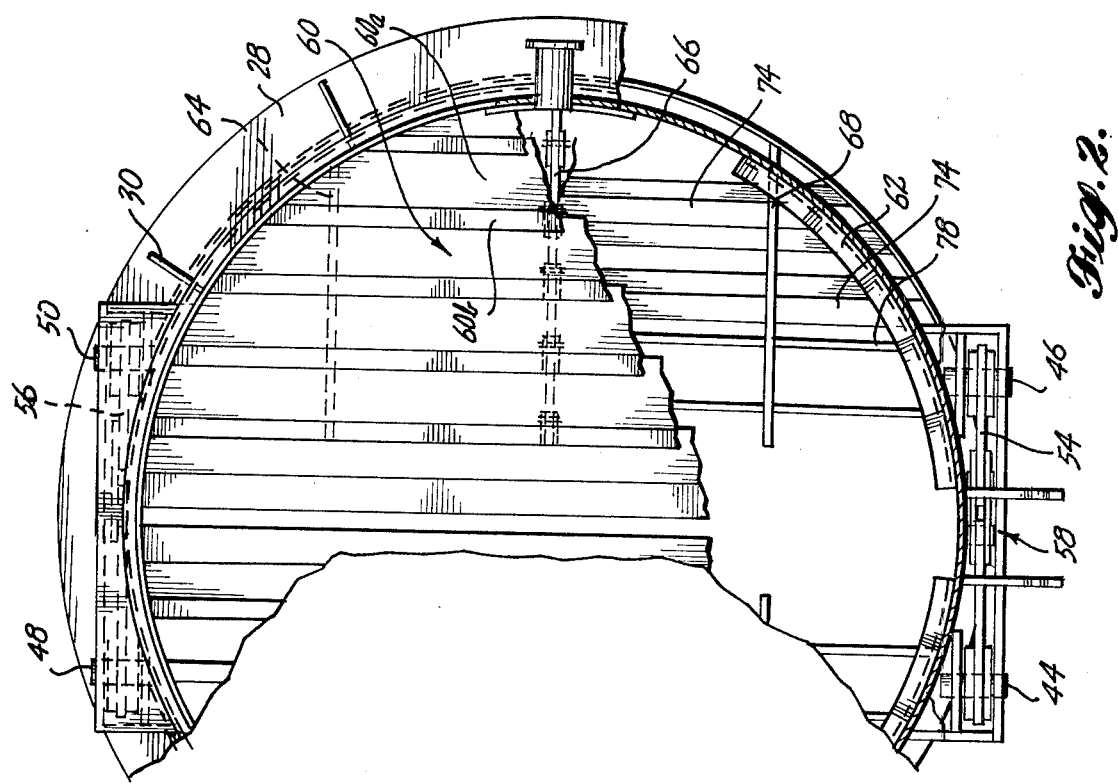

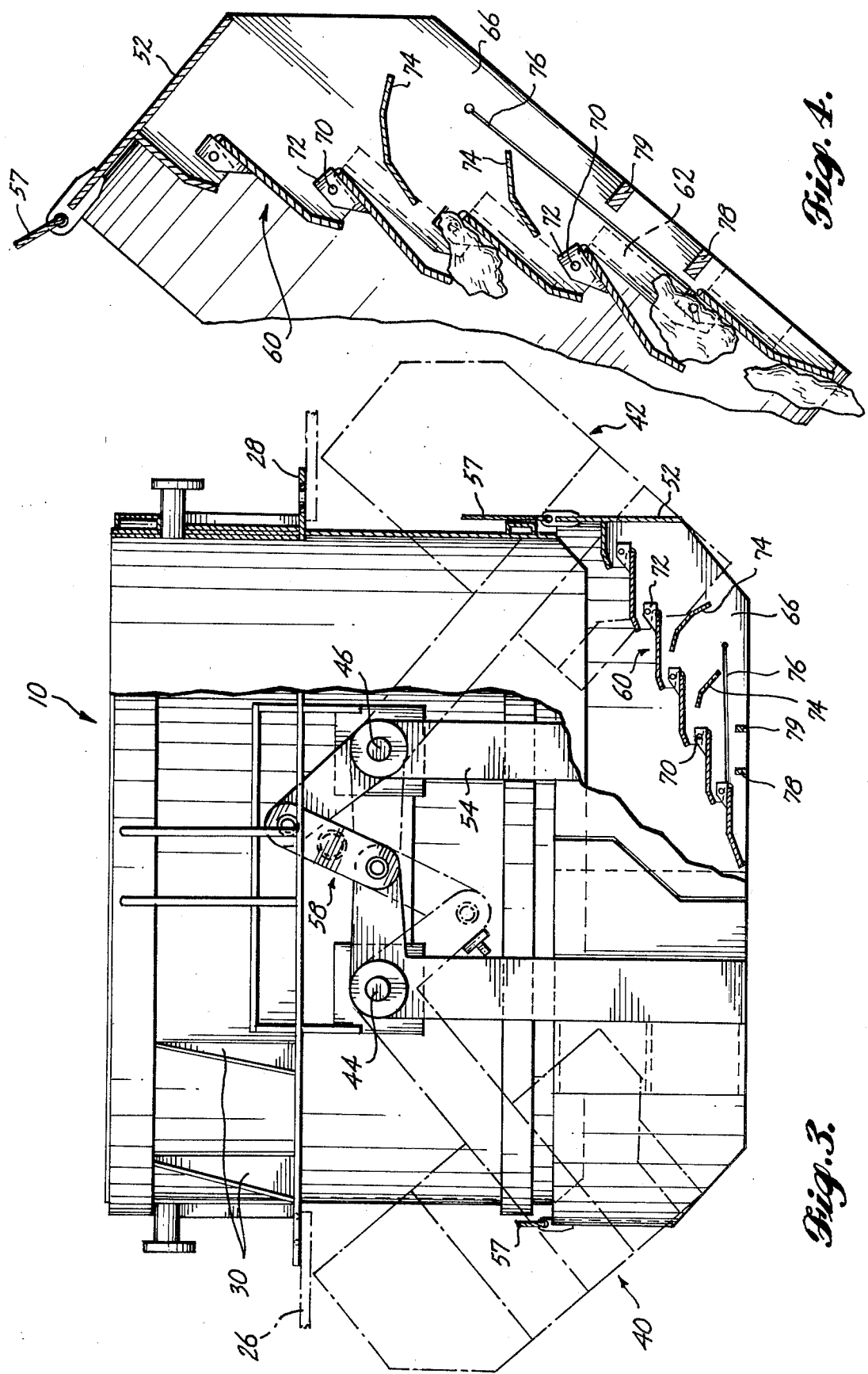

LOUVERED CLAMSHELL DOOR ASSEMBLY FOR PREHEATER CHARGING BUCKET

BACKGROUND OF THE INVENTION

The present invention relates to a preheating apparatus for scrap metal and, more particularly, to a louvered clamshell door assembly for a scrap metal charging bucket in a preheating apparatus.

Preheating assemblies are known in the iron and steel recycling industry for utilizing waste heat from freshly poured metal ingots, billets or molds to preheat scrap metal in preparation for melting. In the past, freshly poured ingots were simply removed from their molds and allowed to cool to the ambient air temperature before being subjected to further processing. Large amounts of heat were lost to the atmosphere during such cooling, inasmuch as iron ingots are typically removed from their molds at a temperature on the order of 1,000° F. With rising energy costs and increasing concern for energy conservation, it has been recognized that the heat contained in freshly poured ingots can be profitably put to use to preheat scrap metal prior to melting.

Several alternative embodiments of scrap metal preheating assemblies are disclosed in U.S. Pat. No. 4,028,048 to Harrison R. Woolworth, the specification of which is hereby incorporated by reference for the purpose of background information. One embodiment of a preheating apparatus includes a double-walled scrap metal charging bucket which is mountable in an enclosure wherein hot ingots may be emplaced under the bucket. The charging bucket includes a clamshell door assembly which opens downwardly to empty the bucket and which forms a hemispherical bucket floor when closed. Woolworth teaches the modification of the otherwise conventional clamshell door assembly by providing multiple apertures in the central portion of the clamshell doors and multiple slots spaced around the periphery of the doors. The apertures in the central portion allow rising hot air to circulate upwardly through scrap metal resting on the clamshell doors. The slots around the periphery of the clamshell doors allow cool air from the upper interior of the charging bucket to descend by convection through convection channels between the double walls of the charging bucket.

In practice, it has been found that the apertures and slots disclosed in Woolworth impair the normal operation of the clamshell doors. Scrap metal pieces resting on the upper inside surfaces of the clamshell doors tend to become jammed in the apertures. This inhibits free opening of the doors, inasmuch as the doors must swing upwardly and outwardly in mutually opposite directions to allow the scrap metal pieces to slide off of the doors and downwardly through the opening. Jamming of scrap metal pieces in the apertures prevents free sliding of the scrap metal relative to the door surfaces and thus impairs opening of the door assembly.

Accordingly, it is an object and purpose of the present invention to provide a clamshell door assembly for a charging bucket which permits free circulation of rising hot air upwardly through the door assembly and yet also adequately retains and supports scrap metal contained in the charging bucket. It is also an object of the present invention to accomplish the foregoing objects without impairing in any way the normal mechanical operation of the clamshell doors. It is yet another object to provide a clamshell door assembly through which air can freely circulate and yet which can also withstand repeated heavy impacts during loading of scrap metal and the stress of repeated thermal contraction and expansion.

SUMMARY OF THE INVENTION

In accordance with the present invention, a clamshell door assembly for a charging bucket includes a pair of clamshell doors wherein multiple stepped louvers form the weight-bearing bottom floor of the door assembly. The doors are hinged to the charging bucket such that they open outwardly and upwardly in mutually opposite directions to empty the contents of the bucket. With the door assembly closed, the louvers are substantially horizontally oriented and step downwardly towards a midline of the bucket assembly where the doors adjoin. The louvers rest upon the upper edges of vertically positioned chair support plates. The chair support plates are secured to the interior surface of hemicylindrical door shells which form the outer structural members of the doors. With the door assembly closed, the two door shells together form a cylindrical base which is coaxial with the charging bucket and by which the charging bucket may be supported from below.

The louvers are not rigidly secured to the chair support plates, but rather are pivotably attached thereto with pivot pins. This allows the louvers to expand and contract over many heating and cooling cycles without loosening or causing damage to the door assembly. Furthermore, pivotably attaching the louvers prevents scrap metal pieces from jamming between the louvers to thereby impair emptying of the bucket.

The mechanical function of the door assembly is much the same as that of conventional clamshell door assemblies. Lever arms attached to the door shells swing about pivot pins extending transversely from the sides of the bucket to open and close the door. During opening of the door assembly, the lever arms and the clamshell doors swing upwardly and outwardly about the pivot pins. This results in an upward sliding motion of the louvers with respect to the scrap metal resting thereon. Since the louvers step downwardly towards the central juncture between the two doors, the doors can swing upwardly and outwardly without exposing edges, apertures or other elements which the scrap metal can engage and thereby impair opening of the door assembly.

During loading of scrap metal into the bucket, scrap metal pieces rarely jam between adjacent louvers because to do so the metal pieces must fall downwardly and then be pushed laterally outwardly between adjacent louvers. This rarely occurs because the force components which might push scrap metal pieces laterally outwardly at the bottom of the bucket are negligible. This is in contrast to the situation in a modified charging bucket as disclosed in Woolworth, where the downward weight of the scrap metal directly causes scrap metal pieces to be jammed into the upwardly opening apertures of the clamshell doors. Moreover, even in the event scrap metal pieces do become jammed between the louvers, the pivotable connection between the louvers and the center chair support plate permits the louvers to swing freely and release the scrap metal pieces when the door assembly is opened.

Thus, the louvered floor of the clamshell door assembly of the present invention both supports and discharges scrap metal as effectively as a conventional clamshell door. Nevertheless, the door assembly of the present invention additionally allows free circulation of rising hot air upwardly through the door assembly and the overlying scrap metal. These and other advantages of the present invention are more fully explained in the following detailed description of the preferred embodiment and the accompanying drawings.

Brief Description of the Drawings

FIG. 1 is an isometric view of a charging bucket in a preheating enclosure, the charging bucket including the preferred embodiment of the louvered clamshell door assembly of the present invention.

FIG. 2 is a partial plan view of the louvered clamshell door assembly in the closed position.

FIG. 3 is a side view of the charging bucket with a partial cross section of the clamshell door assembly in the closed position and a phantom view of the clamshell door assembly in the open position.

FIG. 4 is a partial cross section of one of the clamshell doors in the open position.

Detailed Description of the Preferred Embodiment

Referring to FIG. 1, a scrap metal preheating apparatus is illustrated wherein a single-walled, open-bottomed charging bucket 10 containing scrap metal 12 is enclosed within a preheating housing 14. The preheating housing 14 includes a hinged top door 16 which is opened for removal or insertion of the charging bucket 10. The enclosure 14 further includes side walls 17 and 18, a rear wall 19 and a front wall 20. At the lower end of the front wall 20 is a hinged door 21 which swings upwardly to allow introduction of hot metal billets 22 into the enclosure 14 by means of rails 24 and a rail car (not shown).

The interior of the enclosure 14 is generally separated into an upper portion and a lower portion by a horizontal bucket support plate 26. The bucket support plate 26 includes a central hole through which the bottom portion of the charging bucket 10 protrudes downwardly. The charging bucket 10 rests on the support plate 26 by means of a support ring 28 secured to the outer peripheral surface of the charging bucket 10 and braced by multiple gussets 30. At the rear corners of the enclosure 14 are air circulation ducts 32 and 33 which pass through the support plate 26 from the upper portion of the enclosure 14. The ducts 32 and 33 entend downwardly from the support plate 26 to the floor of the enclosure 14 where they turn and run along the floor of the enclosure 14 and open upwardly therefrom.

During operation, the charging bucket 10 is filled with scrap metal 12 at ambient temperature and emplaced in the preheating enclosure 14. Hot metal ingots or billets 22 are then introduced into the lower portion of the enclosure 14 through the door 21. The hot billets 22 heat the air around them and cause it to rise upwardly into the bucket 10 through a louvered clamshell door assembly which is the subject of the present invention. Cooler air at the top of the enclosure 14 circulates convectively downwardly through the ducts 32 and 33. As stated above, it is the general purpose of this clamshell door assembly to function in essentially the same manner as a conventional clamshell door assembly and yet also allow the hot air from the billets 22 to rise by convection and circulate freely through the scrap metal 12 in the charging bucket 10.

Referring to FIGS. 2, 3 and 4, the preferred embodiment of the clamshell door assembly generally includes two doors 40 and 42 which are connected to the charging bucket 10 by pivot pins 44, 46, 48 and 50 which extend transversely from the sides of the bucket 10. Inasmuch as the two doors 40 and 42 are essentially identical in construction, they are further described herein by reference only to the right hand door 42, it being understood that door 40 is similarly constructed.

Door 42 includes a peripheral hemicylindrical door shell 52 which is connected to pivot pins 46 and 50 by lever arms 54 and 56, respectively. The door 42 swings about the pivot pins 46 and 50 between a closed position wherein the doors 40 and 42 adjoin along a midline and underlie the bucket 10, as shown in FIGS. 2 and 3, and an open position wherein the doors 40 and 42 are swung upwardly and outwardly to allow discharge of the contents of the bucket 10, as shown in FIG. 4 and in phantom outline in FIG. 3. The door 42 is operated by a cable 57 attached to the upper rim of the door shell 52. A conventional linkage mechanism 58 operates to link the lever arms 54 and 56 for simultaneous swinging movement of the doors 40 and 42.

With the door 42 in the closed position, scrap metal 12 within the bucket 10 rests upon a set of stepped louvers 60 which form the weight-bearing floor of the bucket 10. The louvers 60 span the door shell 52 chordwise and are supported at their ends along the inside surface of the shell 52 by louver end supports 62 welded to the shell 52. The louvers 60 are also supported by chair support plates 64, 66 and 68 which support the louvers 60 edgewise and which are secured to the interior surface of the door shell 52.

Each louver 60 consists of a flat louver plate portion 60a having a downwardly angled edge portion 60b along the inside edge thereof. The louvers 60 are typically formed from a single steel plate, using a press brake to form the angled edge portion 60b. The chair support plates 64, 66 and 68 have cooperably formed stepped upper edges to support the louver 60 along both the flat portion 60a and the downwardly angled edge portion 60b.

The louvers 60 are not rigidly secured to the chair support plates 64, 66 and 68, but rather are each pivotably pinned to the center chair support plate 66 by a single pivot pin 70. Each louver 60 includes a pair of mutually spaced louver retainer brackets 72 which extend transversely upwardly from the center outer edge of each louver 60 on each side of the center chair support plate 66. The pivot pins 70 pass through the louver retainer brackets 72 and the center chair support plate 66. Thus, it will be seen that the louvers 60 are free to pivot upwardly with respect to the chair support plate from their normally horizontal weight-bearing positions.

During discharge of scrap metal from the charging bucket 10, the pivotable mounting of the louvers 60 prevents jamming of scrap metal pieces between adjacent louvers and ensures that all scrap metal pieces are free to fall from the bucket 10 during discharge.

The pivotable and non-rigid mounting of the louvers 60 on the chair support plates 64, 66 and 68 additionally allows the louvers 60 to thermally expand and contract over many preheating cycles without producing excessive thermally induced stress, as would be the case if fixed louvers were to be employed. Furthermore, having the louvers 60 pivotably mounted in a loose fashion prevents damage to the door assembly and the louvers 60 during loading of the charging bucket 10 with scrap metal 12. It has been found that the impact of heavy loads of scrap metal 12 falling into the charging bucket 10 typically lossens, cracks and otherwise damages a door assembly formed of fixed louvers or other rigidly constructed members. Pivotable, non-rigid mounting of the louver 60 significantly improves the shock absorbing capability of the door assembly in general and the louvers 60 in particular. Moreover, the individually attached louvers 60 facilitate repair in the event there is damage caused by dropping of particularly heavy or sharp scrap metal pieces into the bucket 10.

The chair support plates 64, 66 and 68 further include air deflectors 74 extending transversely therefrom to deflect rising, hot air through the stepped louvers 60 and into the charging bucket 10. Additionally, each chair support plate 64, 66 and 68 includes a lateral shock absorption slot 77 extending from a position immediately adjacent the rear edge of the lowermost louver 60 on the plate. This slot provides additional shock absorption capability to the plate to minimize and prevent damage during loading of scrap metal 12. Cross braces 78 provide lateral structural support to the chair support plates 64, 66 and 68.

Although the present invention is described and illustrated by reference to a preferred embodiment, it will be understood that various alterations, substitutions and modifications which may be apparent to one skilled in the art may be made without departing from the spirit of the invention. The scope of the invention is, accordingly, defined by the following claims.

The embodiments of the invention in which an exclusive property or privilege is claimed are defined as follows:

1. A louvered clamshell door assembly for the bottom of an open-bottomed charging bucket comprising a pair of cooperable doors pivotably attached to said bucket for mutually opposite swinging movement about substantially parallel horizontal axes between a closed position wherein said doors adjoin along a midline and span the bottom of said bucket to form a weight-bearing bucket floor and an open position wherein said doors are swung outwardly with respect to said midline to discharge the contents of said bucket, each of said doors comprising:

a plurality of stepped louvers positioned substantially parallel to said horizontal axes of swinging movement of said doors, said louvers having inner and outer edges with respect to said midline, and support means for supporting said louvers substantially horizontally and stepped downwardly with respect to one another towards said midline with said doors in said closed position, and connecting means pivotably connecting said outer edges of said louvers to said support means for pivotable movement with respect to said support means about axes substantially parallel to said swinging movement of said doors.

2. The door assembly defined in claim 1 wherein said support means includes a peripheral door shell and a plurality of transversely spaced, substantially parallel chair support plates secured to the interior surface thereof, each of said chair support plates being positioned substantially transversely to said horizontal axes of swinging movement of said doors, said chair support plates each having a stepped upper support edge conformably configured to receive and support said louvers in said stepped relationship.

3. The door assembly defined in claim 2 wherein each of said louvers is pivotably attached to a single chair support plate.

4. The door assembly defined in claim 3 wherein each of said louvers is pivotably attached to a central one of said chair support plates, each of said louvers including a pair of retaining brackets extending transversely from the upper surface of said louver on opposite sides of said central one of said chair support plates, and connecting means comprising a pivot pin passing through said central one of said chair support plates between a pair of retaining brackets extending transversely from said louver.

5. The door assembly defined in claim 4 wherein each of said louvers include a downwardly angled edged portion along said inner edge of said louver and said upper edges of said chair support plates are conformably configured with said louvers and said downwardly angled edged portions thereof.

6. The door assembly defined in claims 4 or 5 wherein said chair support plates further comprise air deflectors extending transversely therefrom for deflecting rising hot air inwardly through said louvers and into said bucket.

7. The door assembly defined in claim 6 wherein said chair support plates each include at least one lateral shock absorption slot for minimizing stress due to impact of falling scrap metal during loading of said bucket.

8. The door assembly defined in claim 7 wherein each chair support plate includes a single lateral shock absorption slot extending into said chair support plate from a position immediately adjacent the outer edge of the lower most louver on said chair support plate.

9. The door assembly defined in claim 8 further comprising louver end supports secured to the inner surfaces of said door shells and positioned adjacent the lower surfaces of said louvers to thereby support the ends of said louvers.

10. In combination with a charging bucket for a scrap metal preheating assembly, a downwardly opening clamshell door assembly comprising a pair of cooperable doors and means attaching said doors to said bucket for mutually opposite swinging movement about substantially parallel horizontal axes between a closed position wherein said doors span the bottom opening of said bucket to form a weight-bearing bucket floor and an open position wherein said doors are swung outwardly away from said opening to allow discharge of scrap metal from said bucket, each of said doors including a plurality of substantially parallel, spaced louvers positioned substantially parallel to said horizontal axes of swinging movement of said doors and also positioned such that said louvers are positioned substantially horizontally with said doors in said closed position, said louvers being further positioned in stepped relationship to one another whereby the respective louvers of each door step downwardly toward a midline where said doors adjoin in said closed position, louver support means for supporting said louvers in said substantially horizontal position with said doors in said closed position, and means pivotably connecting said louvers to said support means at the outer edge of said louvers with respect to said midline for pivotal movement of said louvers about axes substantially parallel to said horizontal axes of swinging movement of said doors, said door assembly thereby providing a weight-bearing floor to said charging bucket through which air is free to circulate.

11. The combination defined in claim 10 wherein said doors each further comprises a peripheral door shell partially encircling the bottom opening of said bucket and wherein said louver support means comprises a plurality of chair support plates attached thereto and extending inwardly therefrom to support said louvers, said louvers being pivotably connected to at least one of said chair support plates.

12. The combination defined in claim 11 wherein said louvers each include a downwardly angled edge portion along the inner edge of said louver with respect to said midline and said chair support plates are conformably configured therewith.

13. The combination defined in claim 12 wherein said chair support plates further comprise air deflectors extending transversely therefrom to deflect rising hot air inwardly and upwardly through said louvers and into said charging bucket.

14. The combination defined in claim 13 wherein each of said chair support plates includes a lateral shock absorption slot extending into said plate from a position adjacent the outer edge of the lowermost louver on said support plate and positioned substantially horizontally with said door in said closed position.

15. A louvered clamshell door assembly for the bottom of an open-bottomed charging bucket comprising a pair of cooperable door pivotably attached to said bucket for mutually opposite swinging movement about substantially parallel horizontal axes between a closed position wherein said doors adjoin along a midline and span the bottom of said bucket to form a weight-bearing bucket floor and an open position wherein said doors are swung outwardly with respect to said midline to discharge the contents of said bucket, each of said doors comprising:

a peripheral door shell and a plurality of transversely spaced, substantially parallel chair support plates secured to the interior surface thereof and positioned substantially transversely to said horizontal axes of swinging movement of said doors, said chair support plates each having an upper support edge stepped downwardly towards said midline, a plurality of stepped louvers pivotably attached to said chair support plates and supported substantially horizontally by said upper edges of said plates with said door in said closed position, said chair support plates each further including a least one lateral shock absorption slot extending into said plate from said upper support edge in a direction substantially horizontal with said doors in said closed position.

* * * * *